United States Patent
Falkenstein et al.

(10) Patent No.: US 8,433,167 B2
(45) Date of Patent: Apr. 30, 2013

(54) FUSED ARRAY PREFORM FABRICATION OF HOLEY OPTICAL FIBERS

(75) Inventors: Paul Falkenstein, Alexandria, VA (US); Brian L Justus, Springfield, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 1582 days.

(21) Appl. No.: 11/689,584

(22) Filed: Mar. 22, 2007

(65) Prior Publication Data
US 2007/0154154 A1    Jul. 5, 2007

Related U.S. Application Data

(62) Division of application No. 10/829,614, filed on Apr. 22, 2004, now abandoned.

(51) Int. Cl.
*G02B 6/032*    (2006.01)
(52) U.S. Cl.
USPC .......................................................... 385/125
(58) Field of Classification Search .................... 385/125
See application file for complete search history.

(56) References Cited

U.S. PATENT DOCUMENTS 6,931,189 B2 *    8/2005    Lee et al. ....................... 385/128
2003/0161599 A1 *    8/2003    Broderick et al. ............. 385/125

OTHER PUBLICATIONS

Russell, P., "Photonic Crystal Fibers", Science, vol. 299, Jan. 2003, pp. 358-362.

* cited by examiner

*Primary Examiner* — Uyen Chau N Le
*Assistant Examiner* — Hoang Tran
(74) *Attorney, Agent, or Firm* — Amy L. Ressing; Kerry L. Broome

(57) ABSTRACT

This invention pertains to a holey fiber and to a fabrication method for making the fiber. The holey fiber can transmit light by total internal reflection or by Bragg diffraction, can be single mode or multimode and can have solid core or a hollow core. The holey fiber has outside diameter typically of 20 microns to 5 mm, a hollow core of a diameter typically of 0.2 micron to 150 microns and longitudinal channels therethrough of a diameter typically of 0.1 micron to 150 microns. The channels are disposed in a desired arrangement with center-to-center distance variation of less than about 2% along the length of the fiber and the cross-section thereof is round that varies less than about 2%.

3 Claims, 6 Drawing Sheets

FUSED ARRAY PREFORM FABRICATION OF HOLEY OPTICAL FIBERS

The present invention claims benefit under 35 U.S.C. §120. This is a divisional application of Paul L. Falkenstein et al, application Ser. No. 10/829,614 filed on Apr. 22, 2004. The entire contents of which is incorporated in its entirety.

BACKGROUND

1. Field of the Invention

This invention pertains to fabrication of optical holey fibers and to the optical holey fibers made thereby.

2. Description of Related Prior Art

There is significant current interest in the novel optical properties of holey fibers. Holey fibers are typically glass fibers that are fabricated with a network of open channels or holes that run the length of the fiber. Theoretical and computational studies of the properties of holey fibers indicate that these fibers may be superior in many ways to conventional step index or gradient index solid glass fibers. All conventional optical fibers confine light by total internal reflection whereby light is confined within a core that has a higher index of refraction than the surrounding cladding. Holey fibers can confine light using either of two mechanisms: conventional total internal reflection or Bragg diffraction, which is also known as photonic band gap confinement. If light is conveyed through a fiber by total internal reflection, a solid core of higher index of refraction than the clad index is needed. Conveyance of light through a fiber by Bragg diffraction can be achieved with an air core and requires a regular and uniform arrangement of channels through the clad. When conveying light by Bragg diffraction, one gets diffraction for certain wavelengths of light, which requires near-perfect periodicity of the channels for the entire length of the fiber. This periodicity allows light of certain wavelengths to be conveyed through the fiber but will not allow light of other wavelengths, in the stop band, through. These wavelengths will scatter and be lost. For instance, a photonic band gap fiber tuned to green light will allow one to see only green light at the end of the fiber while light of other wavelengths will be lost through the sides of the fiber.

The holey fibers that guide light by conventional total internal reflection are also known as effective index fibers. The characteristics of these fibers include: the core refractive index is greater than the cladding refractive index because the cladding has holes throughout; the bandwidth is broad; and periodicity in the arrangement of the holes is not required. In holey fibers, the cladding refractive index is less than the core refractive index not because the composition of the glass is different but because the cladding glass has holes in it. Thus, the effective index of the cladding is less than that of the core. In holey fibers, the geometry of the hole pattern and the size of the index contrast can lead to novel optical properties, such as endlessly single mode behavior, large effective mode area, anomalous group velocity dispersion, high birefringence, soliton effects, supercontinuum generation and lasing. It is not possible to describe an optimum design of photonic crystal fibers in general since different fibers are optimized for each of the above mentioned properties. Although the optical properties of holey fibers are superior to those of conventional fibers for many applications, conventional fibers are usually preferred over holey fibers. This is due primarily to the inability to fabricate holey fibers uniformly and reproducibly.

Holey fibers that guide light due to Bragg diffraction are referred to as band gap fibers, honeycomb fibers or Bragg fibers. In these holey fibers there is no requirement on the core index to be higher than that of the clad, and can be either be higher or lower than the cladding index, the bandwidth is narrow and the hole arrangement must be periodic and highly uniform along the length of the fiber. Band gap fibers are of particular interest in the telecommunications industry because of the possibility of guiding light with essentially zero loss in an air core. Transmission in an air core virtually eliminates nonlinear effects and significantly reduces scattering. Although holey fibers are of great interest and the physics is quite well understood, experimental studies are hampered due to an inability to fabricate high quality fibers.

The greatest challenge facing designers of holey fibers is fabrication. High quality, uniform holey fibers are extremely difficult to make. They are typically made by first stacking silica glass tubes together into a bundle. The bundle is then fused and drawn in a single step at high temperature. During the fusion and draw process, the interstitial spaces between the tubes should close but at the same time, the channels of the tubes should remain open and the shape of the tubes should not distort. In practice, however, it is found that it is virtually impossible to sufficiently heat the bundle to successfully close the interstitial spaces without causing significant distortion in the circular shape of the tubes and the relative orientation of the tubes. The resulting fibers are irregularly shaped and contain holes in irregular patterns. While this is a problem for the fabrication of all types of holey fibers, it is of particular concern for the fabrication of band gap fibers. Effective confinement of light in a band gap fiber requires a highly periodic arrangement of holes and this periodicity must be maintained along the entire length of the fiber. Non-uniformities in band gap fibers are primarily responsible for the optical losses. In order for the potential of band gap fibers to be realized, new fabrication techniques must be developed that permit the realization of fibers that effectively confine light over kilometers of fiber with acceptably low losses.

Microchannel plate glass and nanochannel glass are microstructured glass materials that are similar in some respects to holey fibers. Channel glasses are porous microstructured glass materials that contain arrays of uniformly spaced, regular channels. Like holey fiber, channel glass is fabricated by first stacking composite glass fibers in a bundle and then fusing and drawing the bundle it to smaller dimensions. The process begins by placing an acid-etchable glass rod into an inert glass tube. This pairing of dissimilar glasses is fused and drawn at elevated temperature into a small rod or fiber of smaller diameter. Several thousand of these composite fibers are cut and stacked in a hexagonal-close-packed arrangement yielding a hexagonal-shaped bundle. This bundle is subsequently fused and drawn at elevated temperature to small rods or fibers. At this stage, the fibers are hexagonal shaped and contain a fine structure of several thousand micron-sized, typically 5 to 10 microns in diameter, acid-etchable glass channels in a hexagonal-close-packed pattern. Commercial microchannel plate glass is made at this point by bundling these fibers together in a twelve-sided bundle and fusing the bundle at elevated temperature. Microchannel plates are obtained by cutting the bundle into wafers and etching in a weak acid solution. Etching removes the acid-etchable glass to yield an array of hollow channels. Alternatively, nanochannel glass may be obtained by stacking the hexagonal shaped fibers into a second bundle. This bundle is fused and drawn in the draw tower. In this manner, glass samples with submicron channels with extremely high channel densities can be achieved. After the last glass draw, the boules are wafered, polished and then etched to remove the acid etchable glass. In this way, a glass with extremely uniform, parallel, hollow channels is obtained.

A significant feature of the fabrication of channel glass, that is primarily responsible for the outstanding uniformity and regularity of the glass channels, is the fact that the softening temperature of the etchable glass is higher than the softening temperature of the matrix glass. Thus, when the composite fibers, or the bundles of composite fibers are heated, the temperature can be carefully adjusted such that the matrix glass flows while the etchable glass retains its shape. The etchable glass rods typically are ground to a precise cylindrical shape before they are used to improve the circular shape of the channels. The flow of the matrix glass is responsible for elimination of the interstitial spaces that are initially present between the stacked fibers of glass. The softening point of the etchable glass is typically about 50° C. greater than that of the matrix glass.

Channel glass can yield glass substrates with channels having aspect ratio (channel length divided by channel diameter) up to approximately 1000. While this is an enormous aspect ratio, it falls far short of that required for holey fibers, where the aspect ratio can be in excess of $10^9$. There is no possibility of obtaining long lengths of holey fibers which have channel aspect ratio that is essentially infinite, following the acid etching techniques used for nanochannel glass.

OBJECTS AND BRIEF SUMMARY OF THE INVENTION

An object of this invention is the fabrication of glass holey fibers in a uniform and a reproducible manner.

Another object of this invention is the fabrication of holey fibers with solid or hollow glass core.

Another object of this invention is a method of making holey fibers with guaranteed periodicity in the arrangement of channels required for transmission of light through an air core by Bragg diffraction.

Another object of this invention is fabrication of high quality holey fibers for the telecommunication industry.

Another object of this invention is the fabrication of high quality holey fibers characterized by transmission of light therethrough with essentially zero optical loss, virtually no nonlinear effects and significantly reduced light scattering.

Another object of this invention is holey fibers that have a narrow band width and highly uniform arrangement of longitudinal channels therein.

Another object of this invention is holey band gap fibers with a hollow core.

These and other objects of this invention can be attained by fabricating the holey fibers by stacking into a bundle glass rods and glass tubes in an arrangement, with the glass tubes having a softening point that is higher than that of the glass rods; heating the bundle to a temperature to fuse the glass rods but not the tubes and form a fused element characterized by a continuous glass phase around the tubes; removing the tubes to form a preform characterized by a continuous glass phase and channels, corresponding to the tubes, passing through the preform; and drawing the preform at a temperature below the softening temperature of the glass rods to form the holey fibers, with a solid or hollow core, having a periodic and highly uniform channel arrangement along the length of the fiber.

DETAILED DESCRIPTION OF THE INVENTION

This invention pertains to a fabrication method for making holey fibers and to the holey fibers made thereby. The method generally includes the steps of stacking into a bundle rods and tubes in an arrangement, with the tubes having a softening point that is higher than that of the rods; heating the bundle to a temperature to fuse the rods but not the tubes and form a fused element characterized by a continuous phase around the tubes; removing the tubes to form a preform characterized by a continuous phase and channels, corresponding to the outline of the removed tubes, passing through the preform; and drawing the preform at a temperature below the softening temperature of the rods to form the holey fiber with solid or hollow core, having a periodic and highly uniform channel arrangement along the length of the fiber. For solid or hollow core holey fibers with or without photonic structure, no holes or holes of different sizes can be mixed and matched to obtain the desired effect, although holes of same size are typically used.

A detailed description of the fabrication method will now be presented in connection with the use of Corning Glass 0120 lead silicate glass rods and Pegasus EG-4 lead silicate acid etchable glass tubes. The rods were 1.5 mm in diameter and their softening temperature was 630° C. The tubes were 1.5 mm in outside diameter and 1.1 mm in inside diameter and their softening temperature was about 700° C. Both the rods and the tubes were about 30 cm long. It should be understood that the object of this description is demonstration of the principle of operation and that other structures, such as rods and tubes, of glass or other material, can be used.

Before proceeding with the fabrication procedure of a particular embodiment, a definition of the softening point or temperature is needed, which is the temperature at which a glass fiber suspended in a furnace elongates at a specified rate under its own weight during heating. The viscosity at the Littleton softening point corresponds to viscosity of $10^{7.6}$ Pa.

Figure 1:
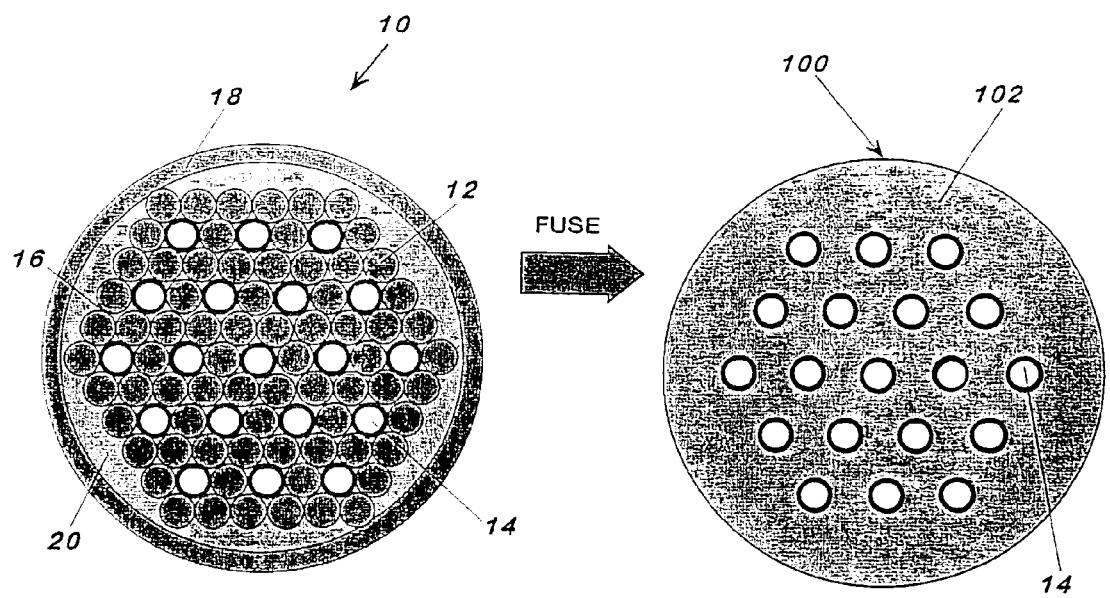
FIG. 1 is a schematic illustration of a portion of the fabrication method to make holey fibers wherein glass rods are stacked into a bundle with glass tubes of a higher softening point than the glass rods in an arrangement to form a fused element after a fusing operation.

The holey fiber was prepared by starting with bundle 10, shown in FIG. 1, which was prepared at ambient conditions by stacking ninety one of the rods 12 into the hexagonal shaped bundle 10. Nineteen of the rods were replaced with the tubes 14 whereby the overall rod-tube arrangement was hexagonal, shown in FIG. 1. The bundle was secured with wire and inserted into clad tube 18 that was 38 mm in outside diameter and 34 mm in inside diameter. The clad tube 18 was of the same glass as the rods and it was coextensive with the rods and the tubes. A hose leading to a vacuum pump was attached to one end of bundle 10 and a subatmospheric partial vacuum of a few psi was applied to remove air from bundle interstices 16. The open spaces 20 between rods 12 and clad tube 16 can be packed with smaller rods, similar to rods 12.

Since the softening point of the rods 12 is 630° C. and of the tubes 14 is 700° C., heating bundle 10 to a temperature below 700° C. allows glass of rods 12 to soften and flow while glass of tubes 14 remains solid. During fusion, a vacuum was applied in order to help the bundle hold its shape and to eliminate as much air as possible from between the tubes. The applied vacuum was subatmospheric of a few Torr. The fusion temperature should not be too high since when glass is too hot, it is more likely to sag and distort the shape of the bundle. In this instance, fusion was conducted by placing bundle 10 in a furnace and slowly raising the temperature of the furnace to a point where glass in rods 12 softened and flowed but glass in tubes 14 were still rigid. The viscosity of the glass in rods 12 at the fusion temperature was $10^{7.6}$ poise. The fusion temperature here was below the softening point of rods 12 and was kept at the lowest temperature at which the glass will soften and flow into and fill interstices 16 and spaces 20. The fusion temperature is 50° C. to 200° C. below the softening temperature of the high softening point material and preferably, 10° C. to 100° C. below the softening point of the lower softening point material. Here, the fusion temperature was about 580° C. Under these conditions of temperature and vacuum, the interstitial spaces between the rods and the tubes, and the spaces between the clad tube and the rods, were eliminated but the circular shape and spacing of the tubes was maintained. The fused element 100, shown in FIG. 1, was then slowly cooled and conventionally annealed to prevent formation of cracks. Annealing was conducted by slowly cooling the fused element to the anneal point of about 450° C., when the viscosity of the solid fused element was about $10^{14}$ poise. Annealing was completed by holding the fused element at about 450° C. for about 20 minutes and then slowly cooling the fused element at about 1° C./min to room temperature. Overannealing can be used by extending the anneal time, such as to about 1 hour. Annealing is a well known procedure that can apply a different schedule for different materials.

The fused element 100 in FIG. 1 is characterized by fused glass 102 as a continuous phase corresponding to the glass rods 12 surrounding spaced tubes 14. Since presence of interstices in a fiber detracts from optical properties, they are eliminated by selecting an appropriate fusion temperature. In the fused element, the tubes are arranged in a hexagonal pattern of two circular rows around a central tube, with six tubes surrounding a central one, except in the outer row. Other patterns, such as square, graphite lattice, and the like, can be used,. although hexagonal pattern is typically used.

Figure 2:
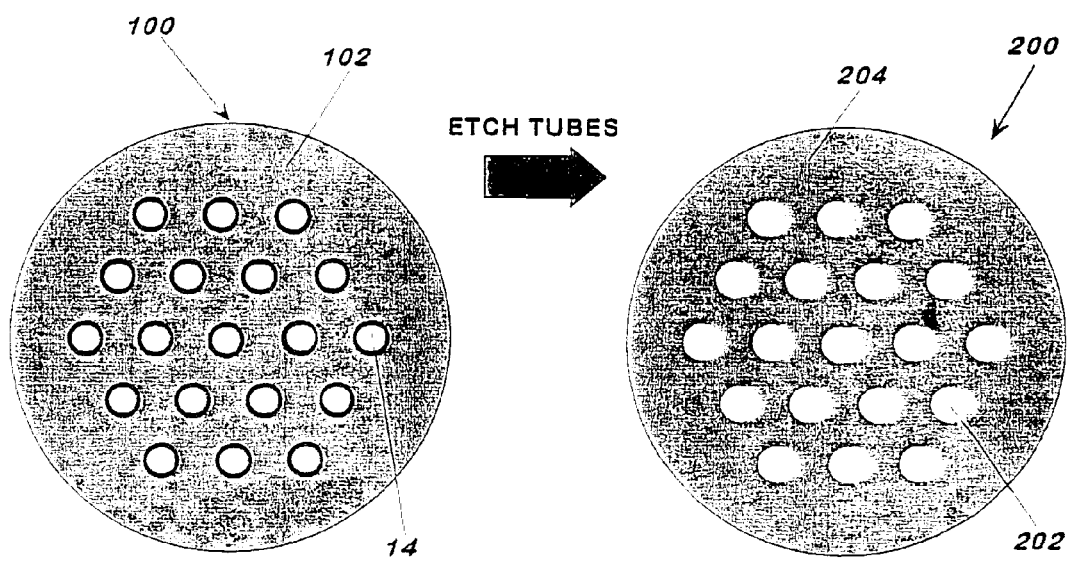
FIG. 2 is a schematic illustration of a portion of the fabrication method to make holey fibers wherein the glass tubes in the fused element are removed to form a preform.

After the bundle has been fused, it is not ready to be drawn. As mentioned above, glass tubes 14 are etchable and they are removed since they are readily dissolved when immersed in acidic solution. The tubes or rods of etchable glass, can be arranged in ways to create channels in the fiber. To remove tubes 14, a dilute nitric acid solution was pumped through the tubes in the fused element for about 2 hours. The glass of the tubes 14 dissolved and was flushed away in a short time of less than a couple of hours. What was left was preform 200, see FIG. 2, and a plurality of spaced channels 202 disposed in glass matrix 204. The matrix and the channels extend the entire longitudinal extent of the preform. The preform 200, shown in FIG. 2, is composed of one glass, i.e., the glass corresponding to rods 12, and there are no defects or interstices in the preform and the channels are uniform and cylindrical in shape and free of distortions.

After removal or etching out of the etchable tubes in the fused element, a preform was formed ready to be drawn. Since the preform has already been fused and the interstitial and other spaces eliminated, it does not need to be heated to high temperature during the draw operation. As already noted, when fusion and drawing are performed in one step, the temperature must be raised to a high enough temperature to permit the glass to flow and fill the interstices and other spaces. Since the preform here does not have interstices and other spaces, the draw can be performed at a temperature near the softening point of the glass, without vacuum. If the draw temperature is too high, the holes will distort and get smaller and smaller and at a temperature several degrees above the softening point, the holes will actually close up because of surface tension. However, when drawing below the glass softening point, the holes open up. Since the draw is performed at a lower temperature than the softening point, distortion of the opening shape and spacing is virtually eliminated. Draw temperature should be as low as possible and should be near but below the softening point of the glass. The draw temperature, however, should not be so high as to introduce distortion or deformation. This is why prior art cannot avoid distortion because of the flow of glass radially to close the interstices. The draw temperature is 10° C. to 50° C., preferably 20° C. to 30° C., below the softening temperature of the lower softening point material. Here, the draw temperature was 605° C., feed was 1 mm/min and draw time was about 3.5 hours. What was produced was a glass holey fiber 300 with an outside diameter of 300 μm, see FIG. 3, with 19 channels 302, each 25 μm in diameter. Photomicrographs of the holey fiber are shown in FIGS. 4 and 5. FIG. 4 is a photograph of the central portion of the holey fiber showing uniformity of the pitch and FIG. 5 is a close-up view of one of the channels showing the perfect shape of the circular channel, which extends the length of the fiber.

A holey fiber was also fabricated in a similar manner disclosed above that had a hollow or air core and four rings of channels surrounding the core. The bundle was stacked with the same 0120 rods and EG-4 tubes as the 19-channel fiber described above. At the center of the bundle were 19 tubes arranged with one in the center and two rings thereof around it in contact. Interstices between the central tubes remained after fusion when the rod glass softened until removal of the central tubes to form the hollow core. Surrounding these central tubes were alternating rings, as illustrated in the left side of FIG. 1. After fusing the bundle at about 580° C., a fused element was obtained, a cross-section of which is shown in FIG. 6 where the etchable tubes in the center are still visible since they have not yet been removed or etched out.

Figure 3:
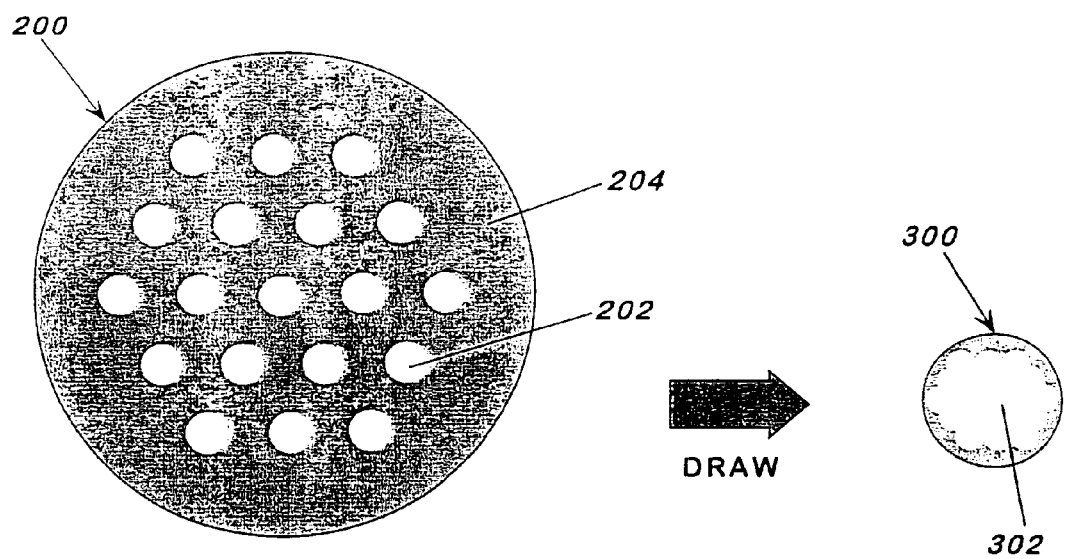
FIG. 3 is a schematic illustration of a portion of the fabrication method for making holey fibers wherein the preform is drawn to form the holey fiber.
Figure 4:
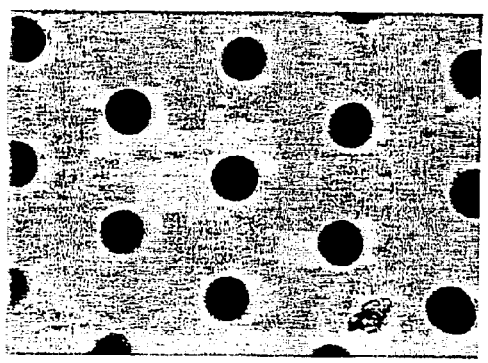
FIG. 4 is a representation of a photomicrograph of a 19-channel holey fiber fabricated according to the procedures disclosed herein, focusing on the uniform distribution of the channels.
Figure 5:
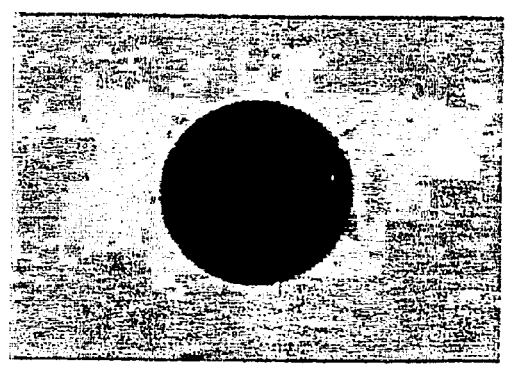
FIG. 5 is a representation of a photomicrograph of a central portion of FIG. 5 showing the exceptional shape of the circular channel.

FIG. 4 shows an enlarged view of the channels in fiber 300, see FIG. 3, where uniformity of pitch is illustrated, and FIG. 5 is an enlarged view of one of the channels in FIG. 4, where exceptional circular shape of a channel is illustrated.

Figure 6:
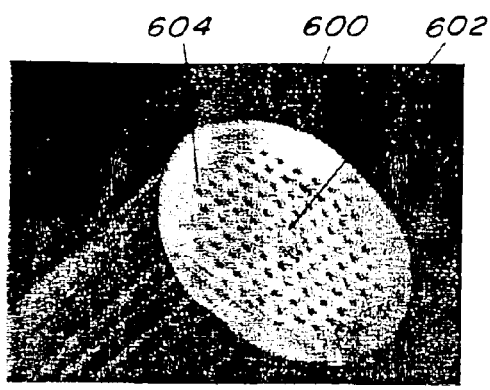
FIG. 6 is a schematic illustration of a close-up view of the end of a fused bundle with the higher softening point glass tubes still visible since they have not been etched out to form a hollow core surrounded by four rings of openings or channels.

FIG. 6 shows enlarged cross-sectional view of hollow holey fiber 600 with the etchable tubes still in place, thus forming the would-be hollow core 602 surrounded by four rings of channels 604.

Figure 7:
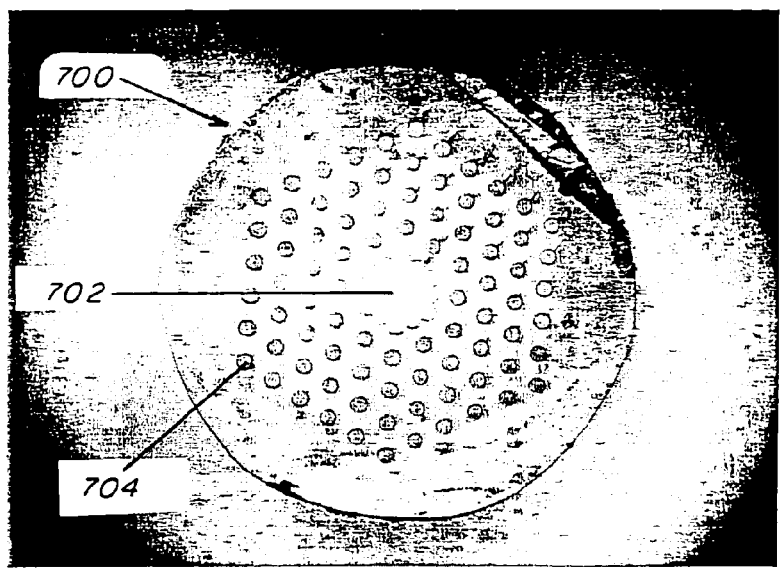
FIG. 7 is a representation of a photograph taken along a cross-section of a holey fiber showing four rings of channels surrounding an air core with circular lobes.
Figure 8:
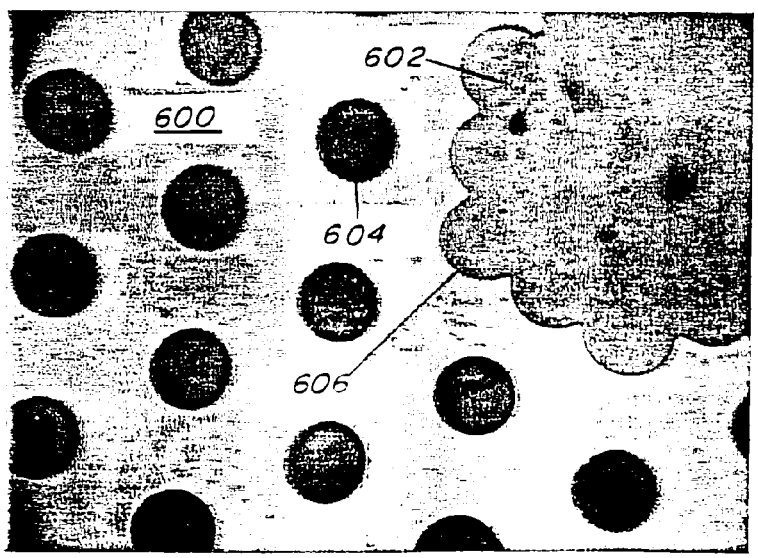
FIG. 8 is an enlargement of the central portion of FIG. 7 showing the uniform pitch of the channels and the air core characterized by the circular lobes.

FIGS. 7 and 8 are close-up views of a holey fiber showing sharp round edges of the channels in fiber 600, the uniform undistorted pitch or center-to-center distance between the channels and the sharp edges of the hollow core 602 and lobes 606 thereof.

Any combination of rods and tubes can be used to build a bundle and yield any desired pattern. Fibers with irregular patterns can also be fabricated using the disclosure disclosed herein, such as polarization maintaining fibers. For example, square tubes and rods can be used for fabrication of fibers having channels with square geometric patterns.

Holey fibers with submicron channels can be readily fabricated. This is because a slight positive pressure can be placed on the channels of the preform during the draw operation to keep the channels open as they are reduced in size to sub-micron channels. Slight positive pressure typically means a positive pressure of below 1 atmosphere, such as a few psi. During a conventional one-step fusion and draw operation, a vacuum is typically applied to help keep components of the bundle in place until they are fused. Application of vacuum has the opposite effect, i.e., that of closing the channels as they are reduced to fiber channels. This is detrimental to fiber fabrication, especially to smaller, submicron channel, fibers, since there is a tendency of the fiber channels to close as they get smaller due to surface tension. In this connection, it should be mentioned that it was practically impossible to apply controllable positive pressure in the prior art fabrication of holey fibers unless positive pressure were applied individually on each channel which is finally reduced to a fiber channel. It should also be mentioned that glass fibers of 100 μm in diameter, and smaller, can be made especially if overcladding of the fiber is practiced.

The holey fibers, fabricated as disclosed above, have thin walls between the fiber channels on the order of 1-2 μm, however, the walls can be made even thinner, such as about 100 nm. Thickness of the walls is indicated by a ratio of pitch to channel diameter, with the ratio approaching 1 being an indication of very small wall thickness since a ratio of 1 indicates zero wall thickness. Reduction of wall thickness is a salutary objective since it is well known that holey fibers with very thin walls between adjacent channels have superior optical properties for some applications.

Figure 9:
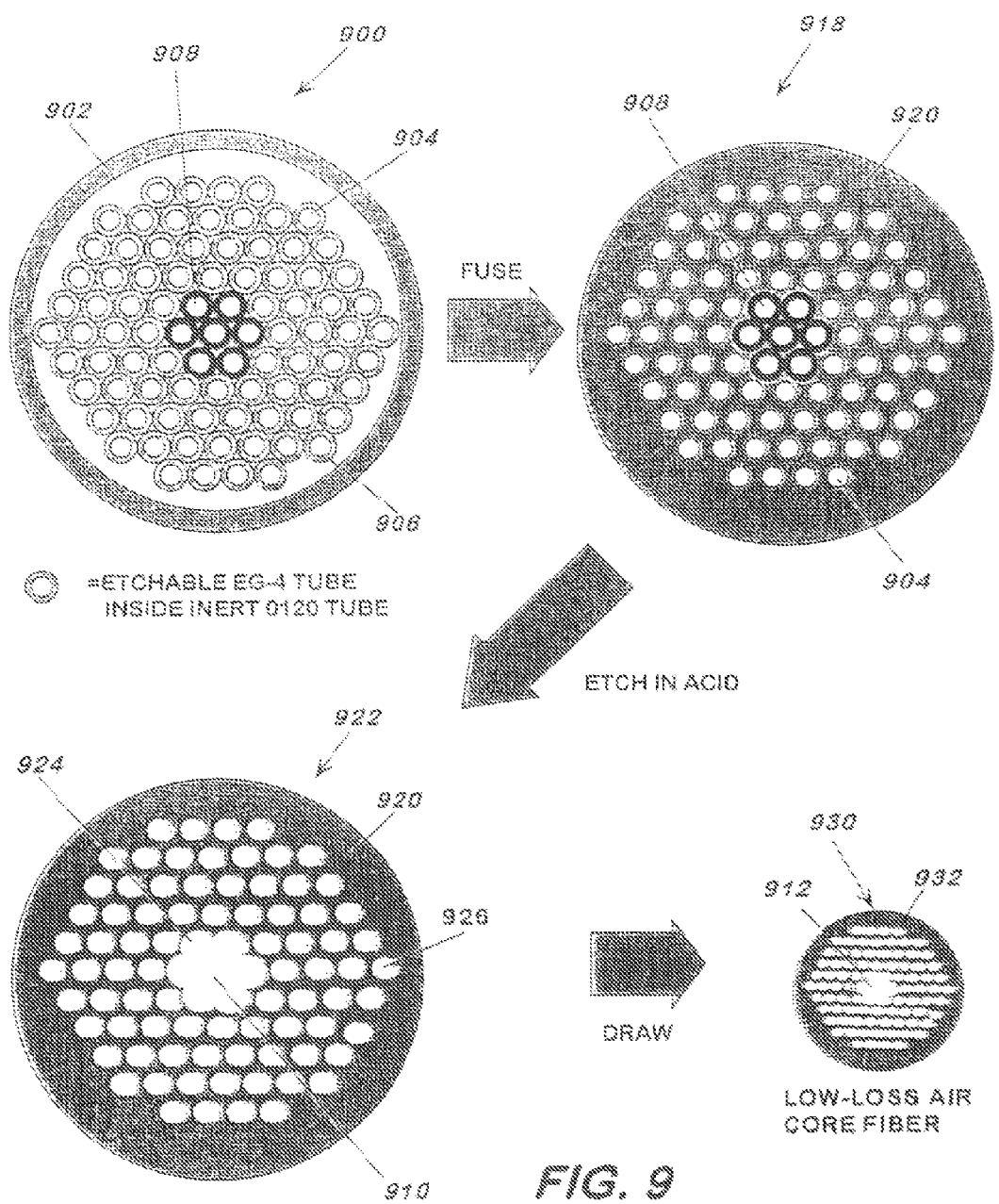
FIG. 9 illustrates fabrication of very thin-walled holey fibers with a hollow core.

In order to reduce the thickness of the glass between adjacent channels, circular bundle 900 was stacked with clad tube 902, in the manner described herein, with thin walled etchable glass tubes 904 of higher softening point are inserted within thin-walled tubes 906 of lower softening point, as shown in FIG. 9. Seven thicker tubes 908 were placed at the center of the bundle to eventually create air core 910 in the preform and air core 912 in the drawn holey fiber. FIG. 9 shows fusion of the bundle 900 at a temperature below the softening temperature of the lower softening point tubes to form fused element 918 wherein the higher softening point tubes 904 remain unchanged and the lower softening point tubes 906 have fused into a continuous glass phase 920 all around the higher softening point tubes. After removing the higher softening point etchable tubes 904 and the central higher softening point etchable tubes 908 from fused element 918, a circular preform 922 was formed composed of continuous glass phase matrix 920, equidistantly spaced openings 926 and central hollow or air core 916 characterized by circular lobes which correspond to partial outline of tubes 908. The preform 922 was then drawn at a temperature below the softening point of the 0120 glass matrix 920 to produce holey fiber 930 with plurality of channels 932 separated by very thin walls approximating the thickness of two tubes of the lower softening point glass and hollow core 912. The channels are arranged in four rings around the hollow core.

The fabrication method disclosed herein, can apply to a wide range of glassy and no-glassy materials. Generally, any material that can be drawn can be subjected to the method herein, although glassy materials of all different glasses are the materials typically used. Of the various glasses, of particular interest herein include silica glasses, silicate glasses, fluoride glasses, chalcogenide glasses and the like. Although holey fibers are traditionally fabricated using silica glass, silica glass is difficult to work with, primarily because it softens at a much higher temperature than other glasses. Silica glass holey fibers can be fabricated using the same or similar techniques of stacking tubes and rods of higher and lower softening point materials in a bundle, fusing the bundle, removing the higher softening point or the higher viscosity material to form a preform, and then drawing the preform to form the holey fiber.

Figure 10:
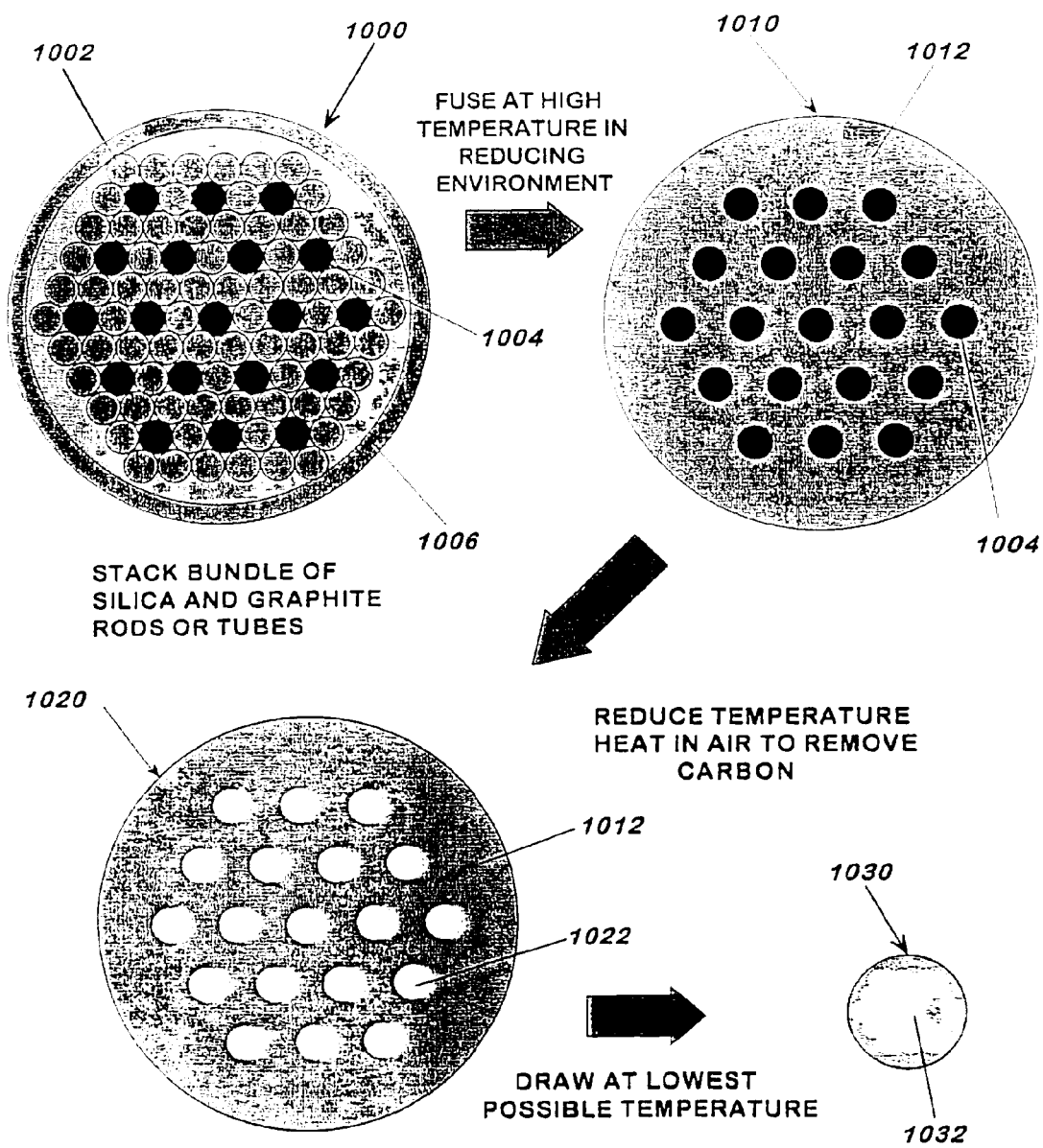
FIG. 10 illustrates fabrication of glass holey fibers using non-glass material for formation of channels in the fibers.

FIG. 10 demonstrates fabrication of a holey glass fiber using non-glass material in place of the higher softening point glass tubes. FIG. 10 shows stacking circular bundle 1000 with silica rods 1002 and 19 graphite rods 1004 in a hexagonal arrangement encased in clad silica glass tube 1006. Since softening temperature of silica glass is about 2000° C. and graphite can easily withstand such a temperature, bundle 1000 should be fused at about 1900° C., a temperature below the softening point of silica glass, to form fused element 1010 with continuous silica glass matrix 1012 containing equidistantly spaced graphite rods 1004. The fusion temperature should be about 1900° C., a temperature below the softening point of the silica rods and the atmosphere should be a carbon monoxide reducing environment to prevent graphite from turning into gaseous carbon dioxide. After fusing bundle 1000 and forming fused element 1010, the fused element should be heated in air at about 1000° C. whereby graphite rods 1004 will be removed by being oxidized to gaseous carbon monoxide which will be vented and preform 1020 will be formed composed of silica glass matrix 1012 and equally spaced openings or channels 1022 disposed in the glass matrix in a hexagonal arrangement. Matrix 1022 will be then drawn at 1960° C., a temperature just below the softening temperature of silica glass, into holey fiber 1030 with 19 channels 1032 of about 10-50 μm diameter.

In one embodiment of FIG. 10, the glass rods 1002, which can also be tubes, were of silica glass which had softening point of about 2000° C. and had a diameter of 1 mm whereas rods 1004 were of graphite, also of 1 mm diameter, which can withstand temperatures above 2000° C. Graphite has a sublimation temperature of about 3600° C. and can be removed by heating to about 1000° C. in an oxidizing atmosphere.

Figure 11:
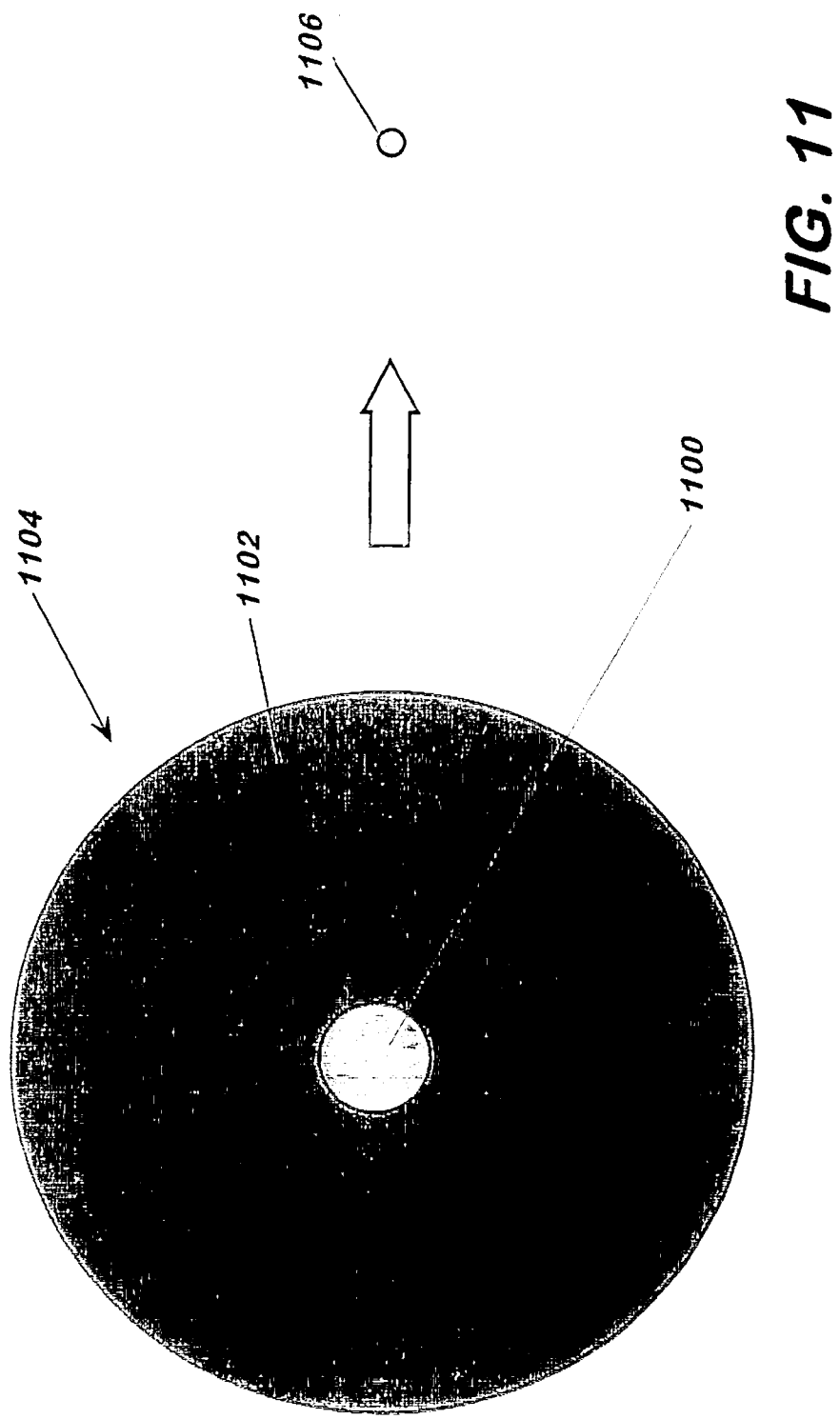
FIG. 11 illustrates reduction in diameter of holey fibers and channels therein.

Generally speaking, after a holey fiber has been drawn, it is possible to reduce its cross-section further and create more complex structures by inserting it into a tube and drawing to a smaller diameter. For example, holey fiber 1100, see FIG. 11, such as shown in FIGS. 7 and 8, can be further reduced in size by inserting it in a thick-walled clad tube 1102 to form structure 1104 Outside diameter of the holey fiber matches internal diameter of the cladding tube and the glass of the cladding tube matches the glass of the holey fiber. This aspect of the fabrication procedure is concluded by drawing structure 1104 at a temperature slightly below the softening point of the cladding tube 1102, as described herein, to form smaller fiber 1106 with even smaller channels therein of micron and submicron diameter.

The holey fibers have typical outside diameters of 20 microns to 5 mm, more typically 100 microns to 500 microns, can be with a solid or hollow air core, have channels arranged in spaced relationship typically of diameter of 0.1 micron to 100 microns, more typically 0.5 micron to 20 microns. The central hollow core diameter is typically 0.2 micron to 150 microns, more typically 2 microns to 25 microns. The holey fibers also can be single or multimode. Depending on size and arrangement of the channels, transmission of light through the core can be by total internal reflection or by Bragg diffraction, which is also known as photonic band gap effect and requires an air core and periodicity of channel arrangement as already noted. The channels have a high degree of uniformity of channel arrangement wherein center-to-center distances vary less than about a couple percent, such as 2%, and channel shape, which is typically round, varying less than about a couple percent, such as 2%. During drawing, the flow of glass is primarily in the axial direction, which aids in the fabrication of perfectly shaped channels in the fibers. Ratio of pitch to channel diameter should be close to 1 for low loss fibers, with ratio of 1 approaching zero wall thickness. Since light transmission is better when the glass wall is very thin or air fill factor is close to 100%, wall thickness in the holey fibers is typically 0.3 to 30 microns, more typically 1 to 10 microns.

While presently preferred embodiments have been shown of the novel fabrications of holey fibers and the holey fibers themselves, and of the several modifications thereof discussed, persons skilled in this art will readily appreciate that various additional changes and modifications can be made without departing from the spirit of the invention, as defined and differentiated by the following claims.

What is claimed is:

1. A holey fiber with an outside diameter from approximately 20microns to 5 milimeters, said holey fiber comprising:
    a core; and
    a plurality of longitudinal channels disposed surrounding said core, wherein the longitudinal channels include diameters of approximately .1 micron to 100 microns; and
    wherein a center-to-center distance between two adjacent longitudinal channels of said plurality of longitudinal channels varies less than 2% along the length of the channels.

2. The holey fiber of claim 1, wherein the holey fiber comprises an outside diameter of 100 microns to 500 microns and said longitudinal channel diameter includes 0.5 micron to 20 microns, and wherein each of said longitudinal channels in the holey fiber has a diameter that varies less than 2%.

3. The fiber of claim 2, wherein said core includes a hollow core and arrangement of said plurality of longitudinal channels are disposed to impart a photonic band gap effect so that light transmitted through the hollow core is directed into the hollow core thereby.

* * * * *